(12) United States Patent
Windhab et al.

(10) Patent No.: US 8,394,441 B2
(45) Date of Patent: Mar. 12, 2013

(54) LOW TEMPERATURE EXTRUSION PROCESS AND DEVICE FOR ENERGY OPTIMIZED AND VISCOSITY ADAPTED MICRO-STRUCTURING OF FROZEN AERATED MASSES

(75) Inventors: Erich Josef Windhab, Hemishofen (CH); Johann Wildmoser, Bern (CH)

(73) Assignee: Nestec S.A., Vevey (CH)

( * ) Notice: Subject to any disclaimer, the term of this patent is extended or adjusted under 35 U.S.C. 154(b) by 804 days.

(21) Appl. No.: 10/597,402

(22) PCT Filed: Jan. 20, 2005

(86) PCT No.: PCT/EP2005/000526
§ 371 (c)(1),
(2), (4) Date: Jul. 1, 2008

(87) PCT Pub. No.: WO2005/070225
PCT Pub. Date: Aug. 4, 2005

(65) Prior Publication Data
US 2008/0254180 A1 Oct. 16, 2008

(30) Foreign Application Priority Data
Jan. 22, 2004 (DE) .......................... 10 2004 003 448

(51) Int. Cl.
*A23G 9/20* (2006.01)
(52) U.S. Cl. .......................... 426/515; 426/524; 426/67
(58) Field of Classification Search .......... 426/516–519, 426/660, 67, 524, 100–101, 515, 565; 99/455, 99/460; 62/342, 354
See application file for complete search history.

(56) References Cited

U.S. PATENT DOCUMENTS

| 3,954,366 | A | | 5/1976 | Fields |
| 5,024,066 | A | | 6/1991 | Goavec et al. |
| 5,221,504 | A | * | 6/1993 | Capelle ..................... 264/211.23 |
| 5,345,781 | A | | 9/1994 | Fels et al. |

FOREIGN PATENT DOCUMENTS

| DE | 4202231 | 6/1993 |
| DE | 69508529 | 9/1999 |
| EP | 0351476 | 1/1990 |
| EP | 0438996 | 7/1991 |
| EP | 0713650 | 5/1996 |
| WO | WO9726800 | 7/1997 |
| WO | W09739637 | 10/1997 |
| WO | WO9817125 | 4/1998 |
| WO | W09924236 | 5/1999 |
| WO | WO0072697 | 12/2000 |

* cited by examiner

*Primary Examiner* — Steven Leff
(74) *Attorney, Agent, or Firm* — K&L Gates LLP

(57) ABSTRACT

The invention describes a low temperature extrusion process and a respective device for an energy-optimized and viscosity-adapted microstructuring of frozen aerated systems like ice cream. Therewith a very finely dispersed microstructure is reached under optimized balance of viscous friction based mechanical energy dissipation (1) and transfer of dissipation heat and additional phase transition (freezing) heat (2) to a refrigerant up to very high frozen water fraction at very low temperatures. With this new process and device aerated masses are continuously frozen and optimally micro-structured under minimized/optimized mechanical energy input. The microstructure of this-like treated masses supports on the one hand preferred rheological properties which lead to improved shaping, portioning and scooping properties, even at very low temperatures, and on the other hand leads to an improved shelf life (heat shock stability) and mouth feel (e.g. creaminess, melting behavior).

Figure 1:
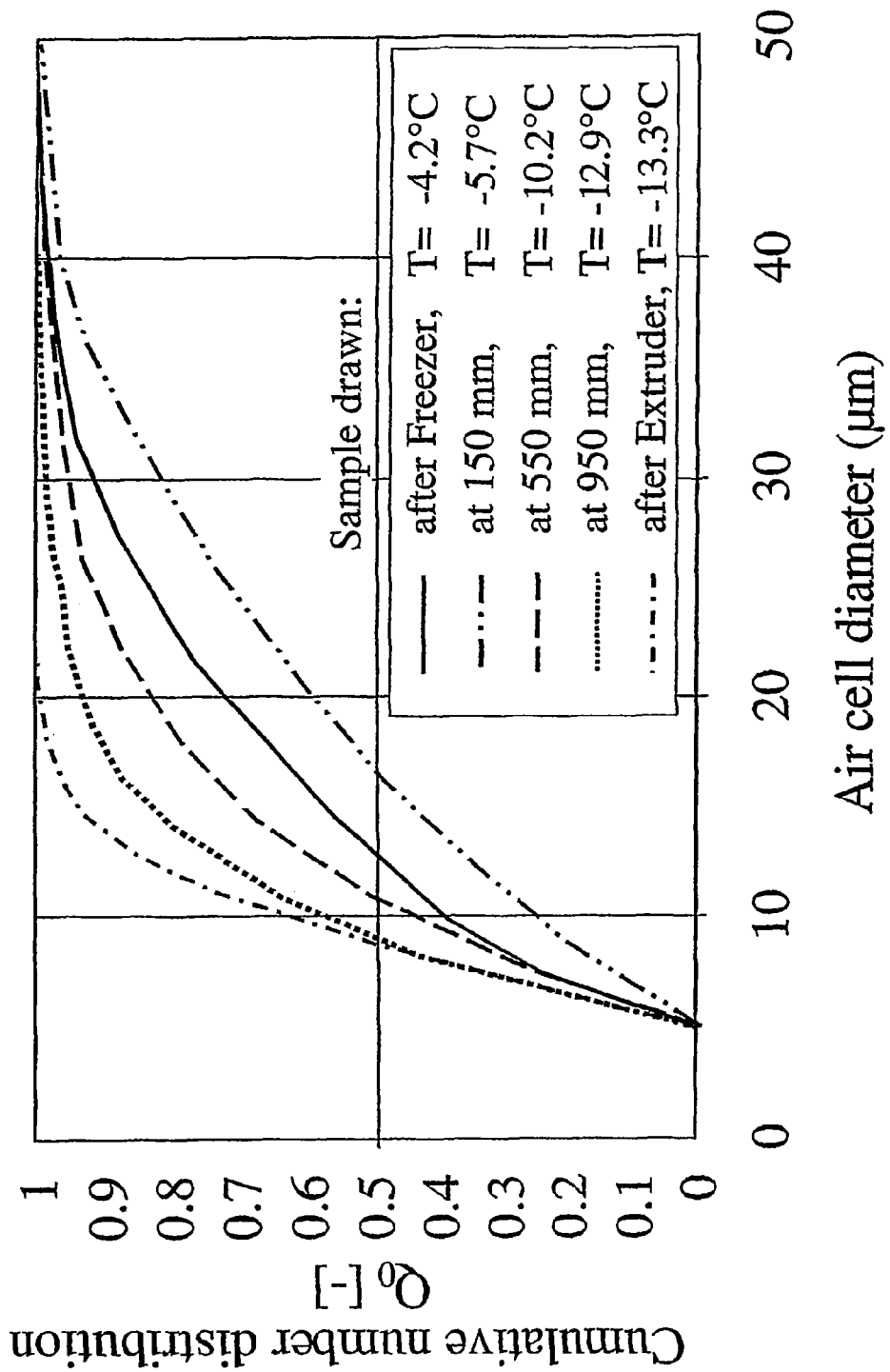

13 Claims, 12 Drawing Sheets

# LOW TEMPERATURE EXTRUSION PROCESS AND DEVICE FOR ENERGY OPTIMIZED AND VISCOSITY ADAPTED MICRO-STRUCTURING OF FROZEN AERATED MASSES

The invention comprises a process for the manufacture of deeply frozen deserts in particular ice cream, under optimized conditions for the input of mechanical energy in order to generate a homogeneous, finely dispersed microstructure and simultaneously optimized conditions for the transfer of dissipated and phase transition (freezing) heat, up to a high frozen water fraction at related low temperatures, as well as a device to run this process.

BACKGROUND OF THE INVENTION

Single and twin screw extruders are well known continuous processing apparatus which are mainly used in the polymer and ceramics but as well in food industry where e.g. pasta and snack products are produced. Since 1992 (DE 4202231 C1) extruders were also suggested to be used for continuous freezing of frozen deserts like ice cream.

Processing Aspects

As described in several publications (see literature review 2-19) a low temperature extruder allows for deep-freezing of ice cream and other food masses like yoghurt and fruit pulps up to a high degree of frozen water fraction (80-90% related to the freezable water fraction) under simultaneously acting mechanical stresses by shear flow.

The dissipated heat caused by viscous friction in the highly viscous partially frozen systems (dynamic viscosity up to $10^4$ Pas) has to be transferred in addition to the crystallization heat (freezing) efficiently, whereas an equilibrium between generated and transferred heat is adjusting dependant on the heat transfer coefficient k (describes the heat transfer through a product layer adhering to the inner wall of the extruder housing to and through this steel wall and into an evaporating refrigerant contacting the outer wall of the extruder barrel.

Up to now, maximum heat transfer coefficients are reached by a proper choice of extrusion screw geometries with a narrow leakage gap between the extruder barrel flight tip and the inner wall of the extruder barrel in order to efficiently replace the frozen material layer next to the extruder barrel wall, and by use of an evaporating refrigerant (e.g. ammonia) for cooling of the extruder housing. The shear rates generated in the screw channel are narrowly distributed due to the use of screw geometries with low, constant screw channel height and a slight axial shift of the screw arrangement within twin-screw extruder systems (EP 0561 118B1). This means, that there are no expanded zones with either very high or very low shear rates. At maximum shear rates of approx. 20-30 $s^{-1}$ for typical ice cream masses outlet temperatures of –12 to –18° C. at the extruder outlet are reached.

The minimum draw temperature of the mass at the extruder outlet depends on the freezing point depressing properties of the mass and the related viscosity of the mass at respective temperature as well as on the mechanical energy dissipation caused by the viscous friction.

In ice cream mass extrusion (e.g. according to patents EP 0561118, U.S. Pat. No. 5,345,781), only a small pressure gradient over the extruder length is generated. The total pressure difference between extruder in- and outlet is in general $\leq$1-5 bars. This guarantees the avoidance of de-mixing the gas liquid (foam) mixture, which is still rather low viscous at the extruder inlet, to a large extent. The specific extruder screw configuration as well as the screw arrangement (twin screw) in the low temperature extruder according to EP 0561118 or U.S. Pat. No. 5,345,781; DE 4202231C1 respectively in addition apply a gentle, efficient mixing of the mass. This is particularly achieved by an appropriate flow stream distribution in the screw flight overlapping/intermeshing zone between the screws in the twin screw arrangement.

Product Aspects

Beside beforehand described apparatus and process related aspects there is main interest in the product specific advantages properties which can be achieved within ice cream treated by low temperature extrusion. Generally it can be stated that such advantageous properties generated by low temperature extrusion relate to a more finely dispersing of the micro-structural ice cream components: ice crystals, air bubbles/air cells and fat globule agglomerates. The extent of such dispersing effects also depends on the ice cream recipe. The following description relates to typical standard recipes of vanilla ice cream, however with variations in the contents of fat/milk fat (0-16%) and in dry matter (35-43%). The advantageous special properties achieved for low temperature extruded ice creams are related to the main structuring disperse elements in ice cream being the water ice crystals (1) the air bubbles/air cells (2) and the fat globule agglomerates (3) which are all much more finely dispersed under the high mechanical stresses acting in laminar shear and elongation flow fields within the extruder flow under low temperature conditions.

For ice crystals, secondary nucleation effects by crystal attrition and crystal breakage in addition to further primary ice crystal nucleation at the inner barrel wall, nucleation lead to size reduction by a factor 2-3 compared to conventional ice cream processing in freezer and subsequent hardening tunnel. Mean air bubble/air cell size is reduced by a factor 3-5 compared to the conventional process due to increased acting shear stresses leading to bubble/air cell break-up.

The intensity of the mechanical treatment in the extruder flow strongly depends on mass viscosity, which is related to the frozen water fraction at a specific temperature. Over the cross section of the extruder screw channel, which forms a narrow annular gap the shear stresses are rather homogeneously and narrowly distributed (now flow zones with stress peaks). Over the extruder length, the mechanical energy input increases with increasing residence time of the ice cream in the extruder channel as well as with the increase of the mass viscosity as a result of an increasing frozen water fraction.

A local destruction of the ice cream structure by too high energy dissipation and related friction heat generation, is avoided at process/apparatus shear rates typically applied (EP 056118).

In fat containing ice creams there are fat globules with atypical main size of approximately 1 micron and below in globule diameter as a result of the ice mix treatment in the liquid state within high pressures homogenizers. Such fat globules also experience an increased mechanical treatment in the low temperature extrusion process. For the fat globules this treatment leads to de-hulling of the fat globule surface from protein/emulsifier membranes and partially also to a strong deformation of the fat globules by the intensive shear acting in the extruder. As a consequence, such treated fat globules are expected to have stronger hydrophobic interactions. Consequently, there is also an increased affinity to the gas/air bubble interface. The increased interaction between treated fat globules leads to the formation of fat globule aggregates. However, the movability of such fat globules in the highly viscous low temperature loaded ice cream is low and consequently there is no chance for the formation of largely expended fat globule aggregates reaching a sensorially (mouth) detectable size. This avoids the generation of a buttery mouth feel causing structure.

From the sensorial view point, the smaller ice crystals and gas/air bubbles as well as the mechanically treated but not too largely agglomerated fat globules lead to a strongly increased perceptible creaminess of the product. At the same time, other sensorial attributes are also significantly positively influenced by low temperature extrusion of the ice cream like the melting behavior, the coldness sensation in the mouth and the scoop ability.

Due to the increased fine dispersity of the disperse ice cream components causing the beforehand described increase of creaminess sensation, low temperature extrusion allows to generate comparable creaminess like conventional ice cream processing at much lower fat content.

Construction Aspects (Extruder Screw(s))

To generate a homogeneous microstructure of the ice cream (1) and at the same time reach very low extruder outlet mass temperatures of lower than ca. −12° C. (2) (standard vanilla ice cream) the construction of the extruder screw(s) with respect to the related flow conditions at adapted rotational speed are of crucial importance.

EP 561118 describes a twin screw extruder for continuous freeze-structuring of ice cream using screw geometries, with especially flat screw channels (ratio channel height H to channel width W about 0.1, ratio of channel height to outer screw diameter about 0.1) and a screw angle of ca. 22 to 30°.

EP 713650 relates to a process which also includes a twin screw extruder for the extrusion of frozen products. The screw characteristics are only described by the ratio of extruder length to screw diameter.

EP 0808577 describes a comparable process using a single screw extruder with similar construction principles of the screw like given in EP 713650.

W097/26800 claims process and apparatus for the manufacture of frozen eatable foams like ice cream using also a single screw extruder. Characteristic properties for the geometry of the extruder screw are the ratios: length of the screw to inner diameter of the extruder housing between 5 and 10, ascending height of the screw to the screw outer diameter between 1 and 2 as well as outer diameter of the screw to inner screw diameter between 1.1 and 1.4. The extrusion screw has only 1 screw flight.

There are also low temperature extruders known (single and twin screw extruders) for the treatment of ice cream with 2-6 screw flights, preferably 2-5, and a screw angle of 28 to 45° preferably 32 to 45°. Preference is given to a ratio of general height to general width of smaller than 0.2 but larger than 0.1. Preferred ratio of screw channel length to inner screw diameter is fixed to 2 to 10, preferably 2-4. This leads to rather short extruders.

The basic difficulty in continuous freeze structuring of ice cream within low temperature extrusion systems relates to the combination of a mechanical treatment and the simultaneous solidification by ongoing freezing. The latter leads to the increase of viscous friction based energy dissipation proportional to the viscosity and consequently to the need of transferring this dissipated energy in addition to the crystallization enthalpy set free by the freezing process. This coupled heat transfer is limited by the rather low heat conductivity of the foamed ice cream mass and the related achievable heat transfer coefficient k in the laminar low temperature extrusion flow of the ice cream. The heat has to be transferred from the flowing ice cream mass through a non-mixed inner barrel wall adhering ice cream layer, through the barrel wall and to the refrigerant contacting the outer barrel wall. The optimization of the flow conditions in the extruder with respect to maximally improved product properties, aims the maximum shear treatment to reach most finely dispersed microstructure at minimum extruder outlet temperature.

In the extruder screw geometries, conventionally described for low temperature extrusion processing a high mechanical treatment efficient for micro-structuring is only reached in the end zone of the low temperature extruder close to the extruder outlet. The length of this structuring-efficient end zone reaches in general less than 50% of the total extruder length.

Due to the fact that, in general ice cream pre-frozen in a conventional ice cream freezer, is transferred into the low temperature extruder at inlet conditions of −5° C. and approximately 35 to 45% of freezable water fraction frozen, this mass experiences only low shear stresses in the extruder entrance zone up to about 50% of the extruder length. The treatment in this extruder domain does not contribute to finer dispersing of the microstructure components (ice crystals, air bubbles/air cells, fat globule agglomerates).

Like shown in recent research work there is even an increase in air bubble/air cell size detected in the first 30 to 50% of the extruder length. The reason for this is the shift in the dynamic equilibrium between air bubble dispersing and air bubble coalescence towards increased contribution of the coalescence due to the lower acting mechanical stresses compared to the precedent treatment of the ice cream in the conventional freezer.

FIG. 1 shows exemplarily such an effect of the air bubble size development along the extruder length in the first 150 mm of a pilot extruder screw channel (15% of the extruder length). In this domain the mean bubble diameter is increased by approx. 25% (see also FIG. 2). Only after 400 to 450 mm (≈40-45% of total length 1000 mm, 65 mm outer extrusion screw diameter and 7 mm screw channel height), the efficient fine-dispersing starts.

Experiments with various screw geometries have confirmed that a viscosity-adapted increase in shear treatment in the first 25 to 70% of the extruder channel length allows to improve this situation remarkably up to negligible coarsening of the structure in the inlet zone, thus allowing for a much better use of the extruder volume.

Problem

The problem of the invention is to freeze food masses continuously to highest possible frozen water fractions of larger than 60 to 65% of the freezable water fraction under simultaneous mechanically induced micro-structuring of the disperse components like ice crystals, air bubbles/air cells and fat globules/fat globule aggregates down to characteristic mean diameters below about 10 microns and narrow diameter distributions ($x_{90.3}/x_{10.3} \leq 10$).

A further problem is to provide a device to carry out such a process.

Solution of the Problems

The problems are fulfilled by the characteristics given in the patent claims 1 and 14.

Further Solutions

Further inventive modifications of the invention are described in the patent claims 2-13 and 15-29.

Advantages

With the inventive process, ice cream masses can be continuously deeply frozen and similarly optimally micro-structured at minimized energy—/power input not possible before. This is enabled by optimized heat transfer conditions from the ice cream mass to the evaporating refrigerant, up to high frozen mass fractions of 80-90% of the freezable water fraction and very low related temperatures at the outlet of the inventive low temperature extrusion process of −12 to −18° C.

The microstructure of this-like treated frozen masses leads to advantageous rheology which provides very good forming, shaping, portioning and scooping properties at much lower temperatures than known before.

Furthermore all low temperature extruded ice cream masses can be packaged and stored without intensive additional hardening (deep cooling), making conventional high energy consuming hardening tunnels no longer necessary.

Another advantage relates to the possible reduction of the fraction of expensive ingredients, conventionally used (e.g. milk fat, emulsifiers) for optimizing consumer relevant properties like creaminess necessary in conventionally processed ice cream.

Ice cream, which is optimized according to this patent application, shows improved creaminess at much lower milk fat content (reduction 3-6%) and without the need of emulsifiers. The reduction fat is of particular nutritional interest.

Figure 2:
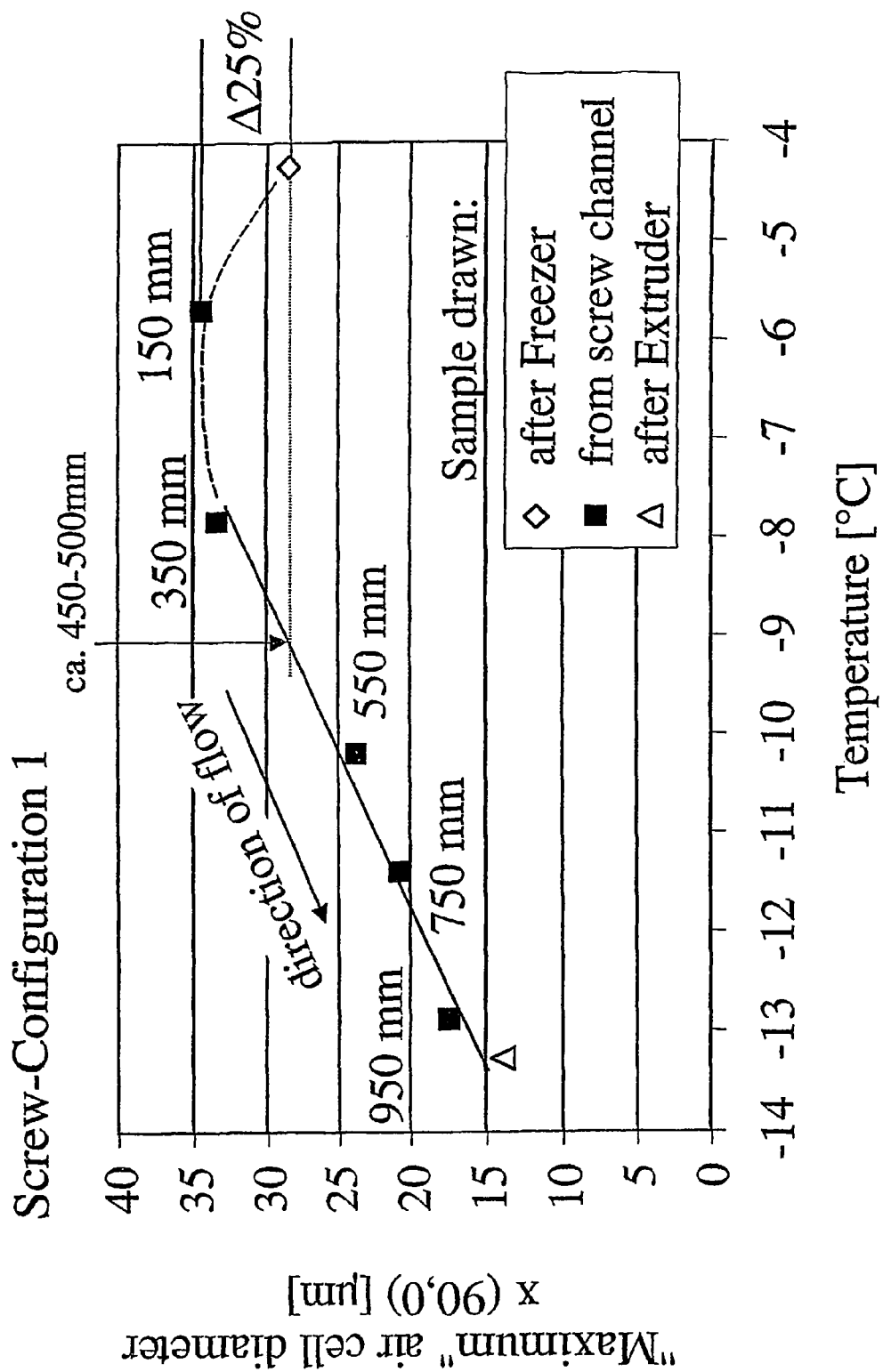
Figure 3:
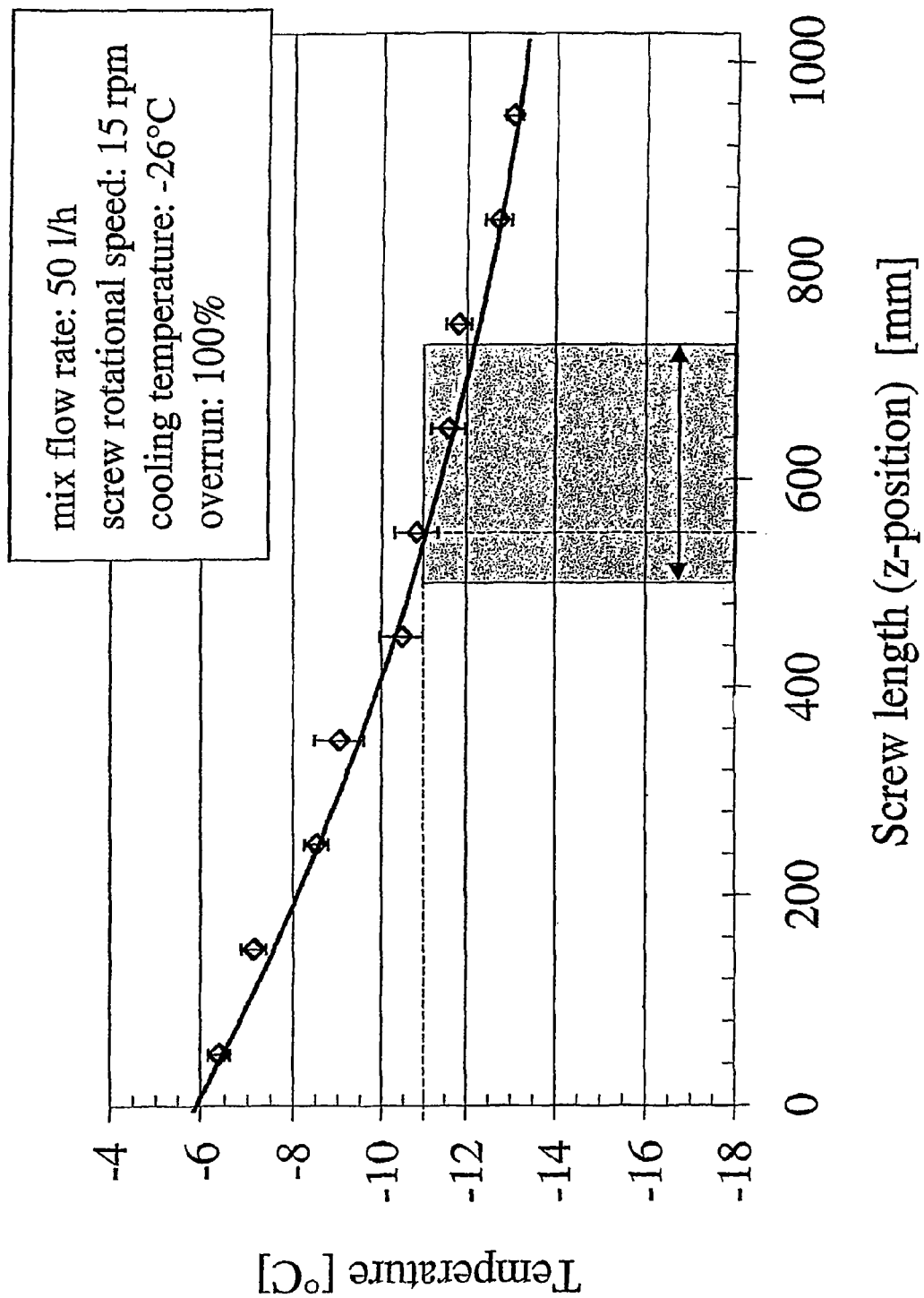
Figure 4:
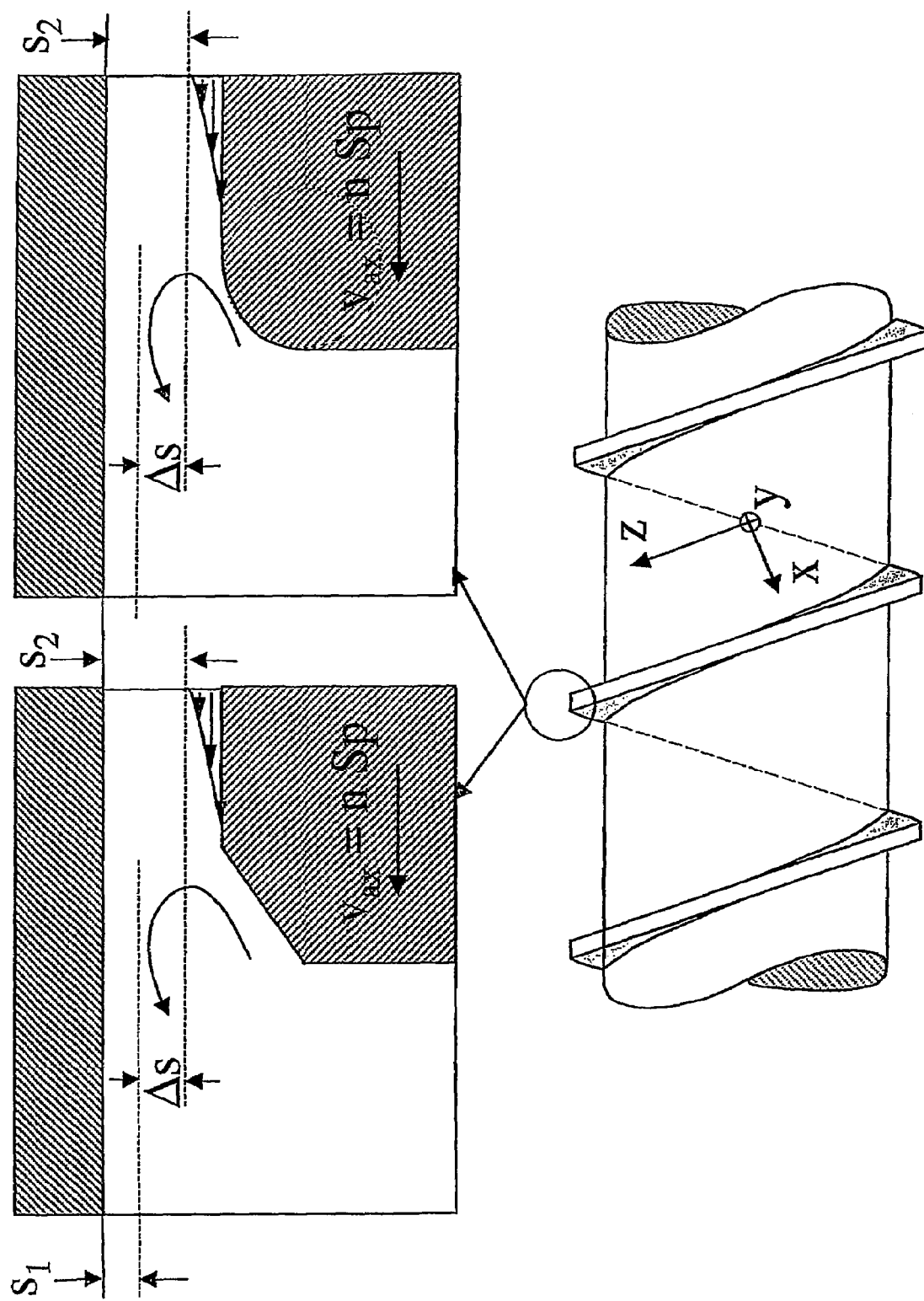
Figure 5:
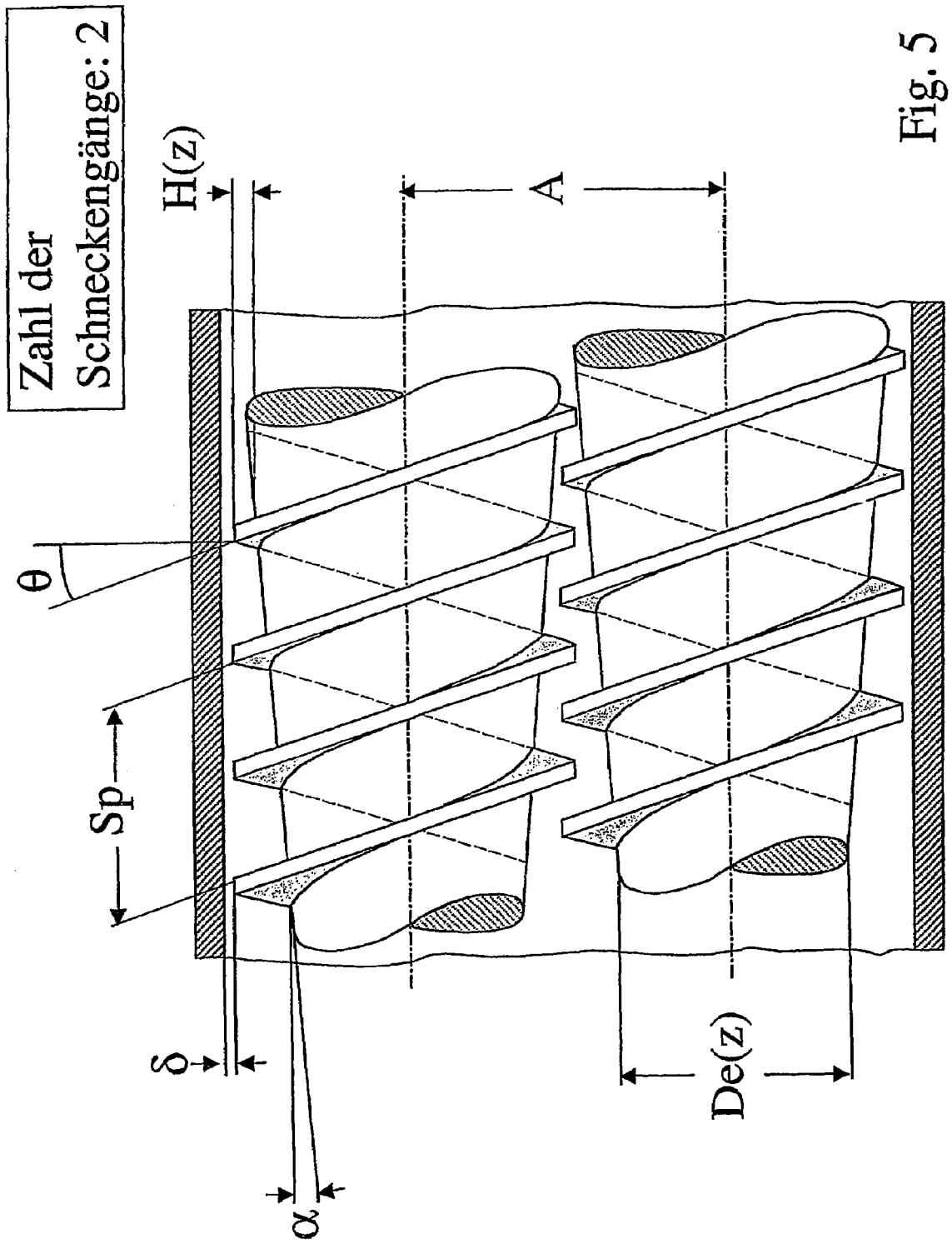
Figure 6:
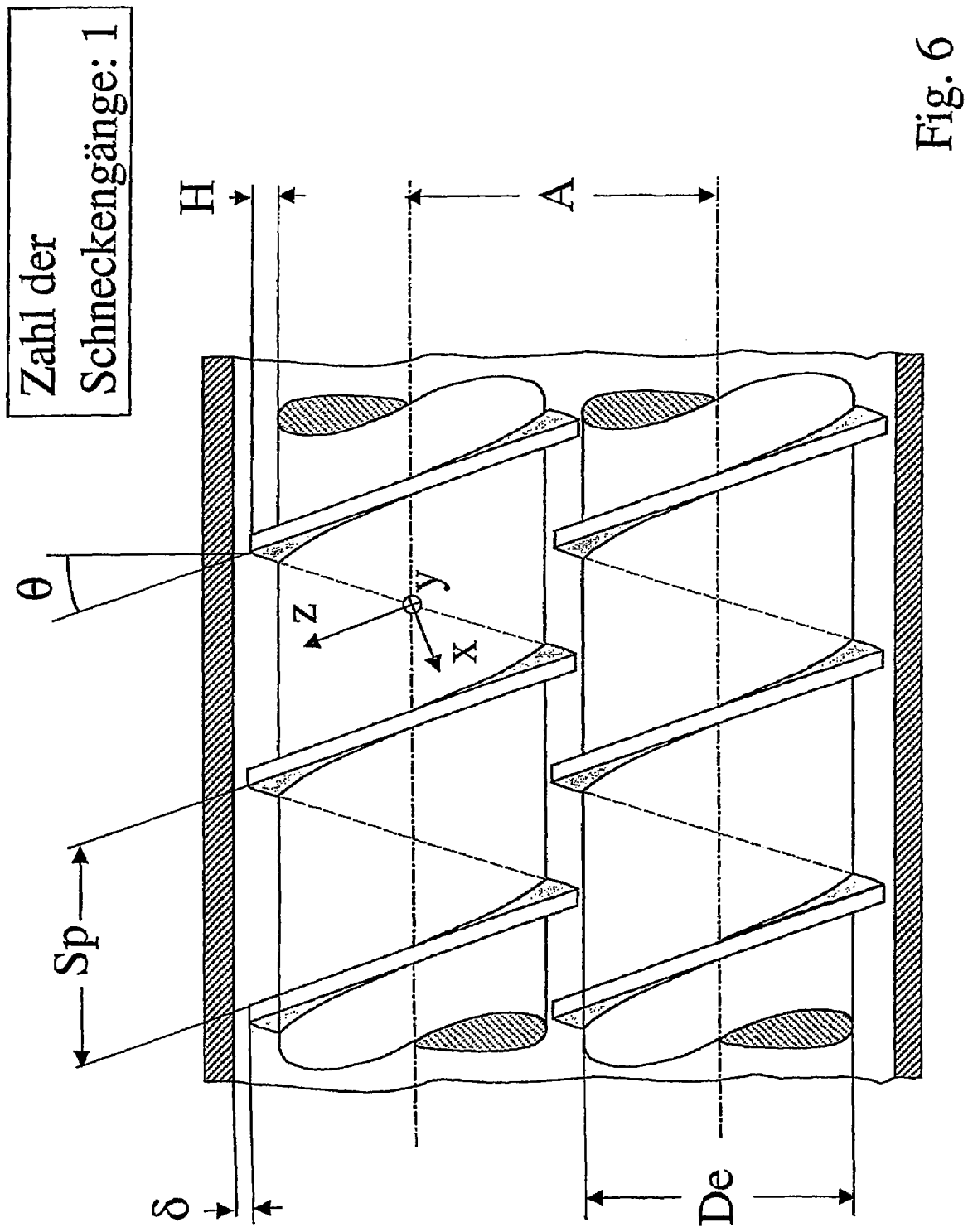
Figure 7:
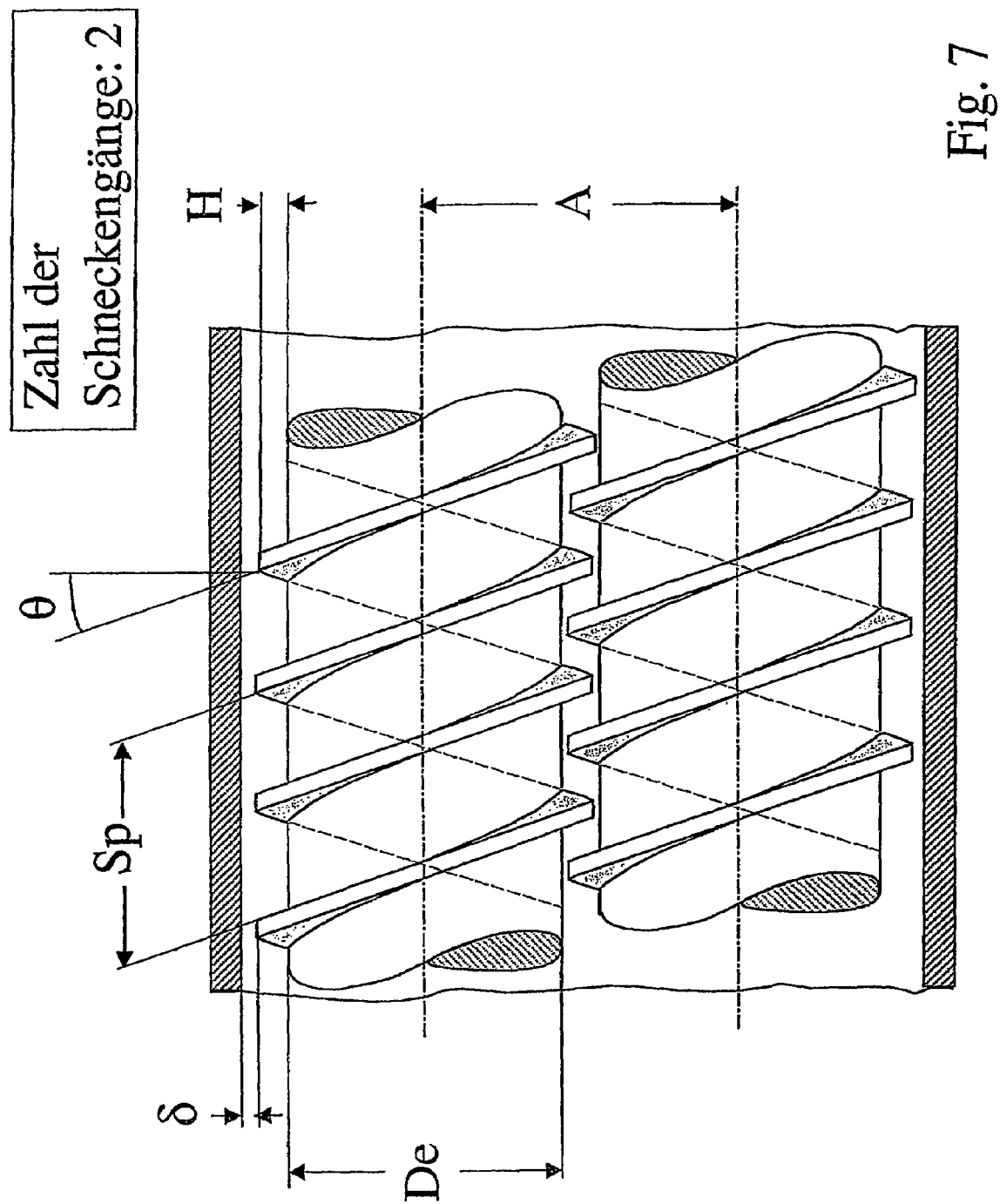
Figure 8:
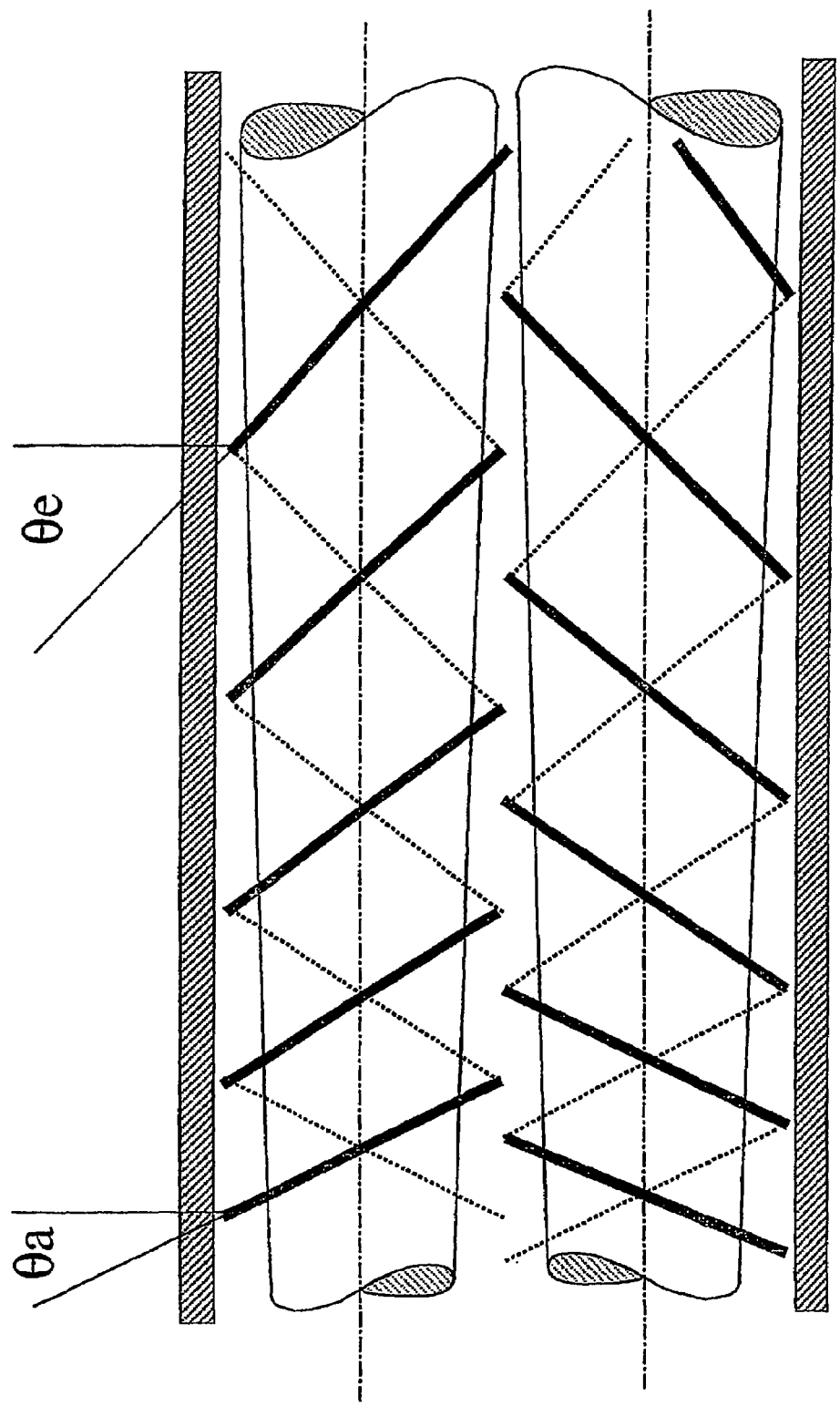
Figure 9:
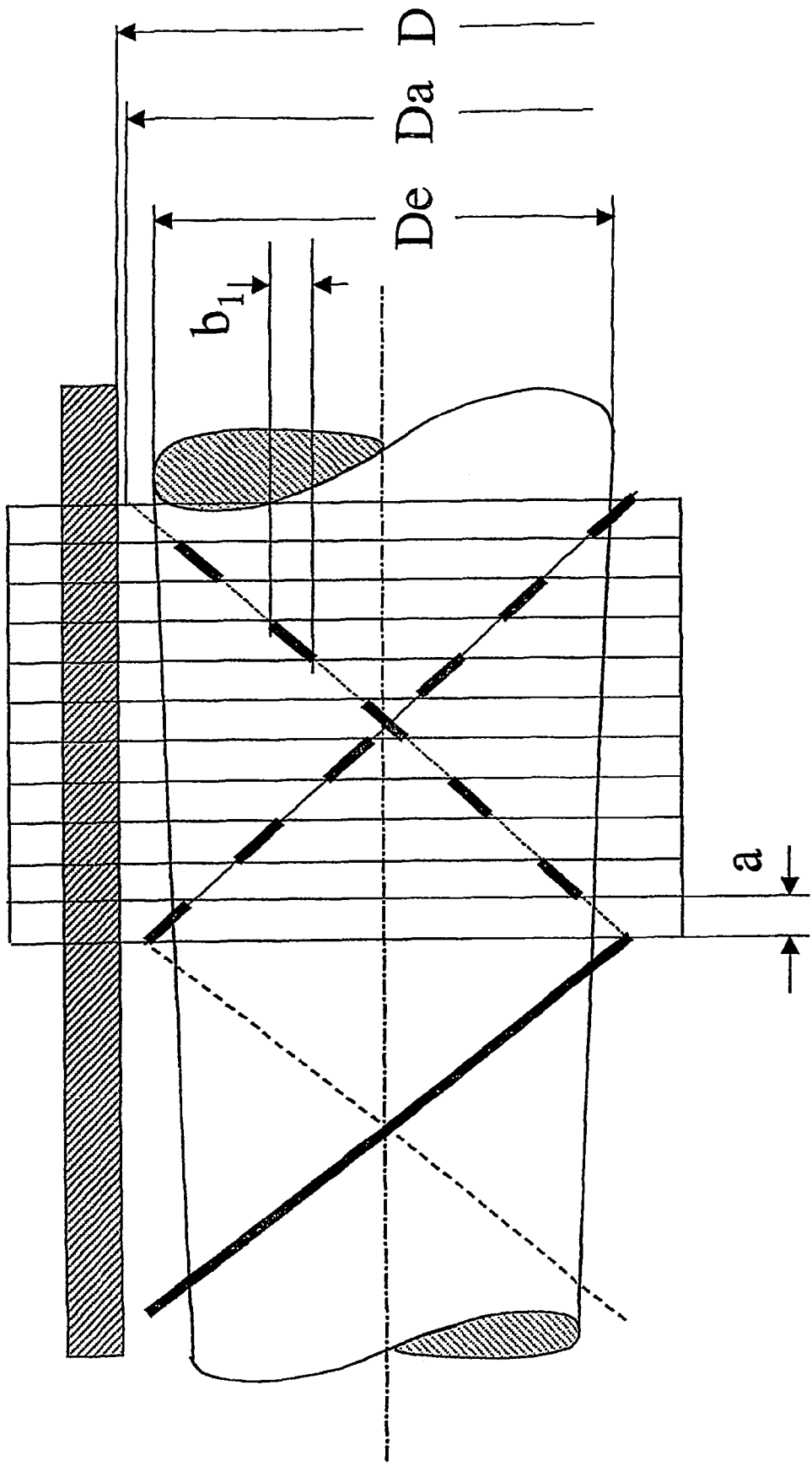
Figure 10:
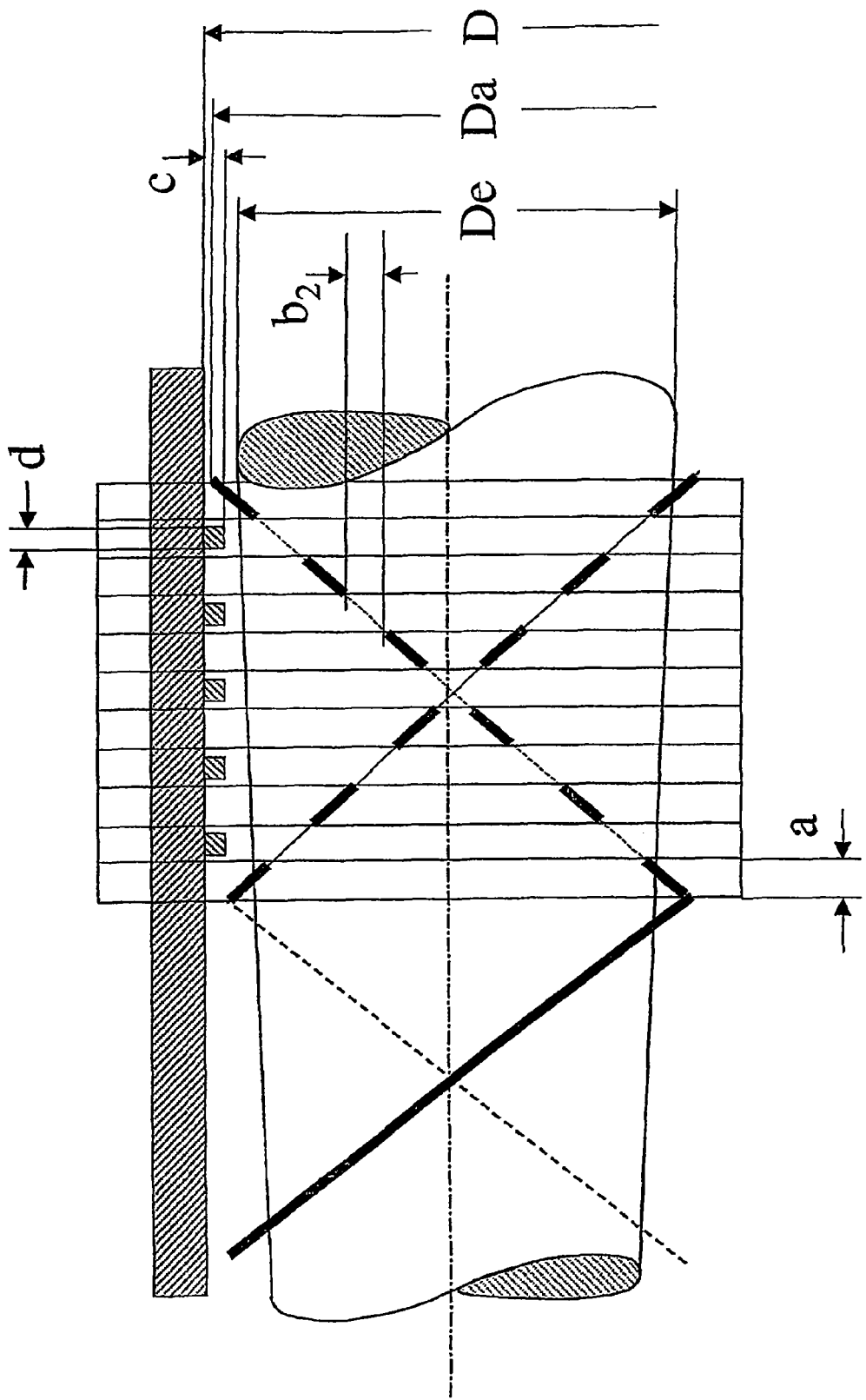
Figure 11:
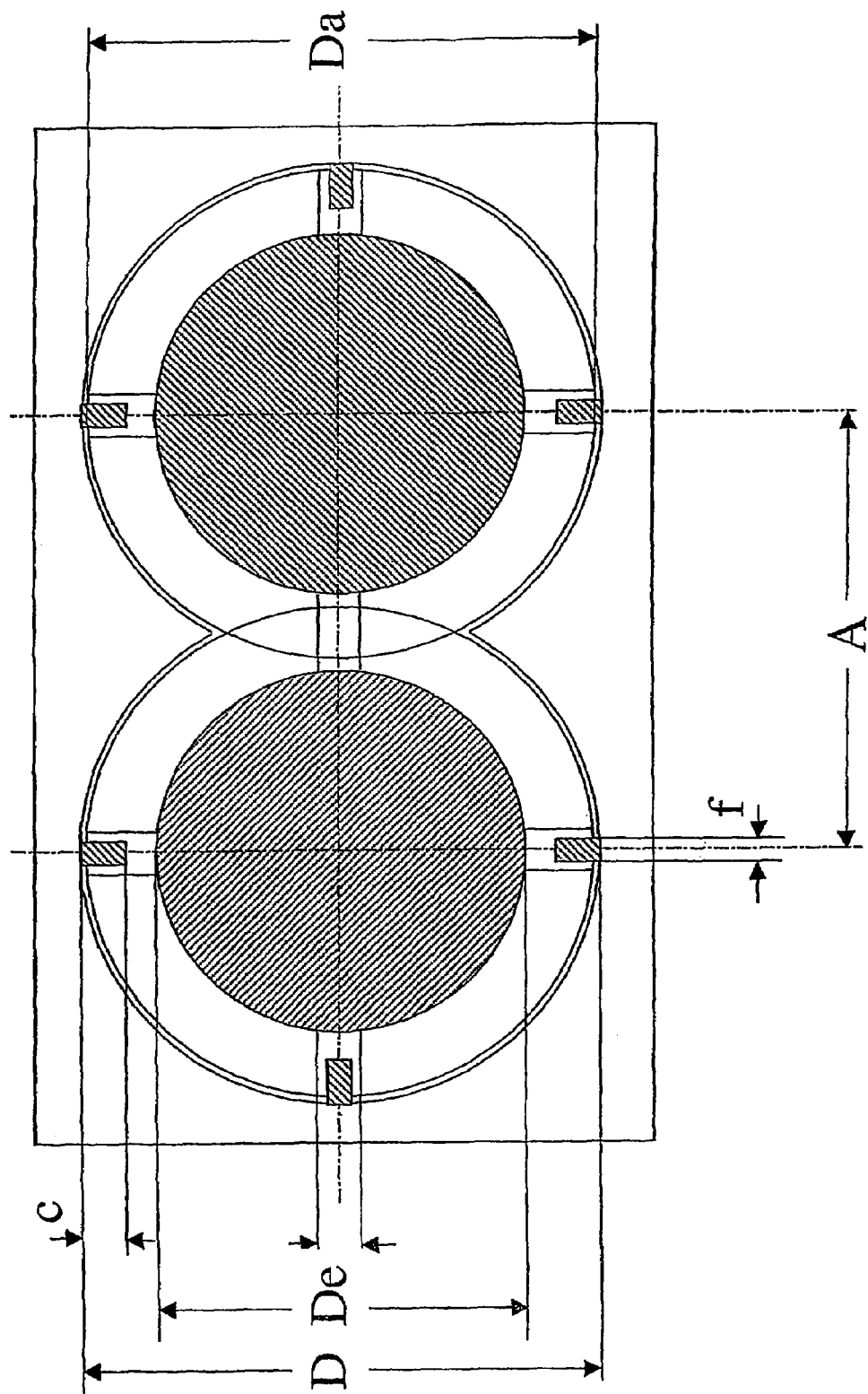
Figure 12:
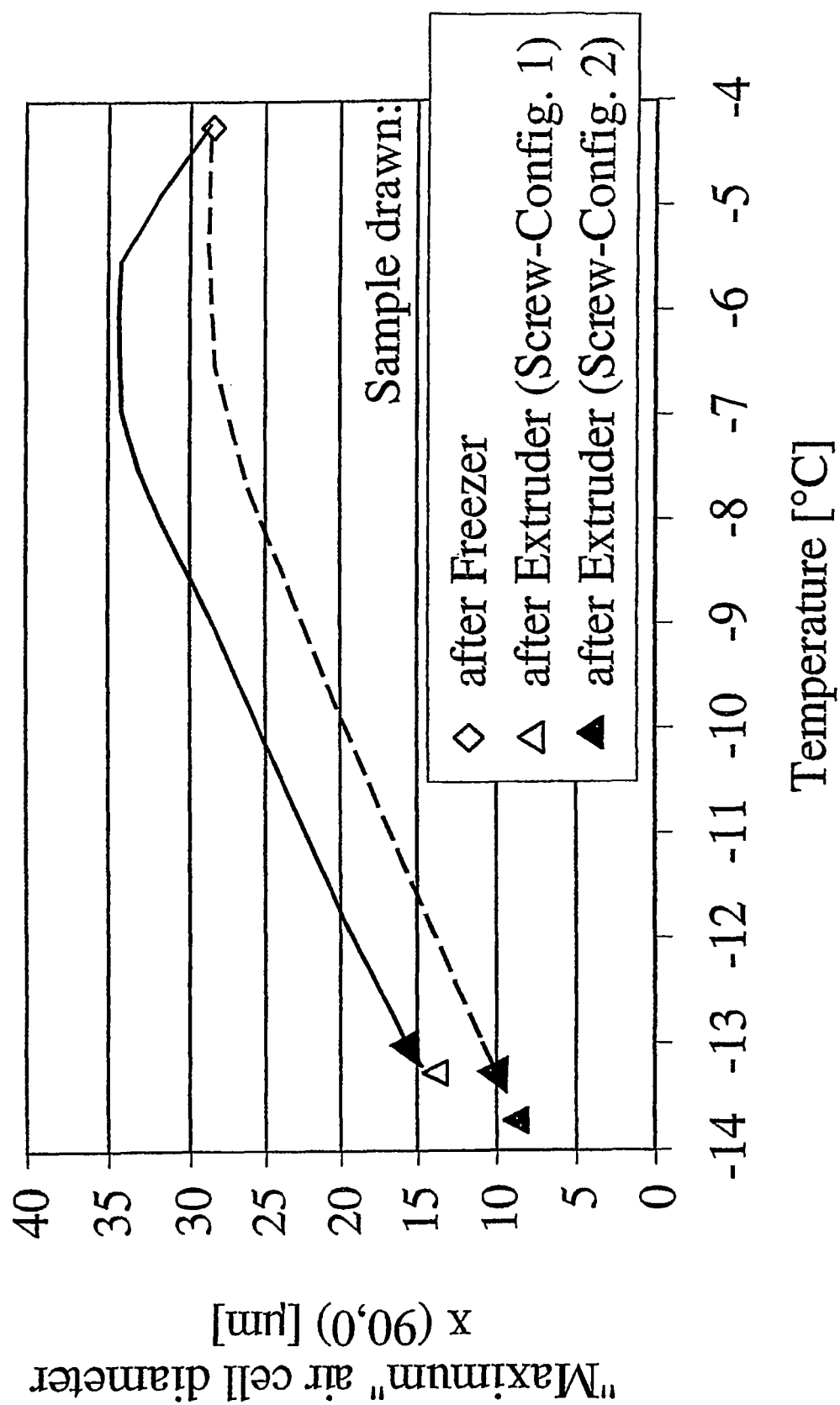

Further characteristics and advantages can be derived from the subsequent drawings in which the invention is partly demonstrated as examples:

It is shown in:

FIG. 1: the size distribution of bubble diameters as measured over the extruder length;

FIG. 2: the maximum bubble diameter as a function of temperature over the extruder length;

FIG. 3: a typical temperature profile over the extruder length, measured in the ice cream mass;

FIG. 4: the geometric construction of the leakage gap between the screw flight edge and the inner barrel wall;

FIG. 5: arrangement of 2 screws with increasing screw channel height over the extruder length (example for screws with two screw flights);

FIG. 6: arrangement of two screws with constant screw channel height (here exemplary for screws with one screw flight);

FIG. 7: arrangement of two screws with constant screw channel height (exemplary for two screw flights);

FIG. 8: arrangement of two screws with increasing screw channel height over the length of the extruder and similarly decreasing screw angle over the extruder length (exemplary for extrusion screws with two flights);

FIG. 9: exemplary construction of screw with cuts in the screw flight (exemplary for 2 screw flights);

FIG. 10: arrangement of screw with cuts in the screw flight and intermeshing pins fixed at the inner barrel wall (exemplary for two screw flights);

FIG. 11: cross section view of arrangement of two screws with cuts in the screw flight and intermeshing pins fixed to the inner barrel wall;

FIG. 12: comparison of maximum bubble size development over extrusion length for two different screw configurations (configuration 1: conventional; configuration 2: according to invention, here with adapted screw channel height).

According to the invention the local mechanical power or energy input is adapted to the local heat transfer (heat flow rate from ice cream to refrigerant) in such a way, that a continuous reduction of the temperature in the ice cream over the extruder length is resulting as shown in FIG. 3 and after half to two thirds of the extruder length an ice cream temperature of below −11° C. (standard vanilla ice cream with 10% milk fat, 36-38% total dry matter content, 100% overrun and sugar composition leading to about 55-65% of frozen water fraction at −11° C.) or a freezing degree of >55-60% frozen water fraction related to the freezable water is reached.

The fine dispersing of the air bubbles/air cells (major number fraction below 10 μm, max. bubble size below 20μ), fat globule/fat globule aggregates (major number fraction below 2 μm, max. fat agglomerate size below 10 μm), and in particular a reduction of the ice crystal connectivity (major number fraction smaller than 25 μm, max. ice crystal diameter smaller than 50μ) are generated in the second half to final third of the extruder length at ice cream temperatures below ≦11° C. or frozen water fractions of respectably ≧60% (related to the freezable water fraction) by the shear stresses generated in the flow.

In order to reach such a final finely dispersed micro-structuring state in the extruder, the dispersing history in the inlet zone up to the second third of the extruder length is of major importance. A maximum efficient pre-dispersing in this part of the extruder is required, in particular for the air bubbles/air cells. Similarly the formation of ice crystal aggregates should be reduced or avoided. For this purpose, a sufficiently high mechanical energy/power input and related dispersing stresses are required.

With increasing cooling/freezing and related increase of ice cream viscosity, according to the invention, the energy/power input is adapted by variable adjusted screw geometry for locally optimized heat transfer. Influencing variables are rotational screw velocity (1), ice cream layer thickness (2), ice cream density (3) and ice cream viscosity (4). For optimized heat transfer it is required to increase 1 and 3 and decrease 2 and 4 as far as possible. 3 is mainly influenced by the locally acting pressure in the extruder screw channel. 4 increases along the extruder channel as a consequence of the increase of frozen water fraction. 1 and 2 are also locally optimized according to the invention by adapting the screw geometry under given rotational speed conditions according to the inventive concept of the energy optimized and Viscosity Adapted Micro-structuring (VAM-concept).

This concept intends to optimize the local flow fields in the extruder, with the aim to minimize power input and at the same time maximize dispersing efficiency of the disperse structure components of the ice cream and furthermore maximize mixing efficiency in order to optimize the convection supported heat transfer.

The constructive implementation of this concept into low temperature extruders can surprisingly simply be adapted as shown from experiments by: minimizing of the leakage gap between outer screw flight edge and barrel housing (1), an optimized screw flight front edge contour/profile (2), locally adapted screw channel height H (3), supported by locally adapted number of screw flights (4) and/or locally adapted screw angle (5) and/or locally adapted cuts in the screw flights (6) or locally adapted pins intermeshing with the cuts in the screw flights, the pins being fixed to the inner barrel housing (7).

Based on experimental investigations using a special measuring and sampling technique, which allowed to measure local temperatures and ice cream micro structure in each length segment of the low temperature extruder (see list of publications: 17-20), subsequent inventive constructions of the extruder screw geometry have been derived. These constructions go much further compared to conventionally existing constructions for low temperature extrusion.

(1) Minimum Leakage Gap Between Screw Flight Edge and Inner Barrel Wall

Leakage gap between screw flight edge and inner barrel wall according to this invention is fixed to <0.1 mm preferably <0.05 mm.

(2) Optimized Screw Flight Front Edge Contour/Profile

The flow of the ice cream mass at the front edge of the screw flight is strongly influenced by the contour/profile of this edge.

FIG. 4 demonstrates an exemplary inventive construction. The flat inclination or application of a radius allows to generate a compression flow in front of the flight edge such that the thickness of a frozen ice cream layer remaining at the inner barrel wall is reduced, compared to the flow in the case of a sharp screw flight front edge. The reduction of the ice cream adhering to the barrel wall is denoted as $\Delta s$ and shown in FIG. 4.

Even a small reduction of these wall adhering layer thickness has shown to have a surprisingly strong positive impact of the heat transfer from the ice cream mass to the inner barrel wall. According to the invention for a screw flight thickness of larger than 5 mm, the leakage gap width should be below 0.1 mm (preferably below 0.05 mm) and inclination of the flight edge should be in the range of 30-45° over a screw flight thickness of $\geq 2$ mm. In the case of a radius contour at the front edge of the screw flight, the related radius should be $\geq 2$ mm.

(3) Locally Adapted Screw Channel Height H

A reduced screw channel height H (see FIG. 5) increases shear rate proportional to 1/H at constant rotational screw velocity. This leads to a related increase of the dispersing shear stresses. As a consequence, the percentage of mechanical energy input dissipated into viscous friction heat is also increased. Reduced layer thickness of the ice cream mass in the screw channel according to a reduced screw channel height improves the heat transfer condition. Furthermore, with respect to flow behavior of the ice cream in the screw channel, the reduced ice cream viscosity at increased shear rate (non Newtonian, shear-thinning flow behavior) has to be taken into account.

Feeding a conventionally pre-frozen ice cream in a conventional ice cream freezer (standard vanilla ice cream; −5° C. approx. 35-40% frozen water fraction, viscosity at shear rate of 1 $s^{-1}$ approx. 10 Pas), according to the invention, in the inlet zone of the extruder (I) a ratio of screw channel height and outer screw diameter between 0.03 and 0.07, in the middle of the extruder length (II) between 0.1 and 0.15 and in the final third of the extruder length (III) between 0.1 and 0.25 are adjusted.

For a twin-screw extruder used in a feasibility study with an outer screw diameter of 65 mm, this leads to absolute heights of the screw channel of 2-5 mm in the inlet zone (I), of 6.5 to 9 mm in the middle zone (II) up to 6.5-16.25 mm in the outlet zone (III).

From one to the other zone there can be a stepwise change in the screw channel height but a continuous change is preferred. In the latter case, a preferred range for the angle between inner barrel wall and screw root contour ($\alpha$) as shown in FIG. 6 is resulting between $0.4° \leq \alpha < 0.7°$ (FIG. 5).

(4) Locally Adapted Number of Screw Flights

An increase of the number of screw flights reduces the screw channel width reverse proportional and consequently increases the number of resulting screw channels (see FIGS. 6 and 7). The barrel wall "wiping frequency" is proportionally increased with the number of screw flights. This improves heat transfer (i), but increases similarly the mechanical power/energy input and consequently the dissipated heat (ii). The latter limits at low temperatures and high viscosities the number of screw flights. According to the invention, the extruder is divided into minimum three segments along its length. Preferably in the first third of the extruder length 3-6 screw flights, in the second third 2-3 screw flights and in the final third 1-3 screw flights are preferably installed.

(5) Locally Adapted Screw Angle

An increase in the screw angle θ up to 45° increases the axial self-conveying mass flow characteristics of the extruder screw and also enhances mixing. Mixing can further be increased for larger screw angles, which has a positive impact on the convective heat transfer. However, this has also a strong impact on the dissipated heat from mechanically induced viscous friction. Due to this an increase of mass viscosity due to increased frozen water fraction is consequently also limiting the increase of the screw angle.

According to the invention in the inlet zone of the extruder, screw angles between 45 and 90° (preferably 45 to 60° are considered. The extreme case of 90° means axially oriented "steering" blades which no longer form a screw (see FIG. 8). In the middle zone of the extruder length screw angles between 30 to 35° and in the final third of the extruder length between 25 and 30° are preferably taken into account.

(6) Locally Adapted Cuts in the Screw Flights

Local cuts in the screw flights according to FIG. 9 allow the transfer of ice cream mass through these cuts, which improves mixing and dispersing as well as convective heat transfer. At the same time viscous friction and related dissipated heat is increased. Consequently such treatment does only make sense if the mass viscosity is not too high. According to the invention, cuts in the screw flights are applied in the inlet zone of the extruder (up to the first ca. 20-30% of the extruder length). The width of the cuts should be close or similar to the screw channel height. The same rule should be valid for the non-cut parts of the screw flight.

(7) Intermeshing Pins Locally Adapted to the Cuts in the Screw Flights, the Pins Connected to the Inner Barrel Wall The adaptation of pins attached to the inner barrel wall intermeshing with the cuts in the screw flights lead to more intensive dispersing flow in the gap between the screw flight and the pin (see FIGS. 10 and 11). This is of particular advantage if re-coalescence of air bubbles/air cells in the inlet zone of the extruder under low viscosity conditions shall be avoided. In a high viscosity range, the high energy dissipation in such gaps is disadvantageous.

According to the invention, pins intermeshing with the cuts in the extruder screw flights are preferably installed in the first 10-20% of the extruder length.

FIG. 12 shows exemplary the effect of a partially optimized screw channel height on the development of the mean bubble size of an ice cream over the extruder length. A reduction of the mean bubble size by about 20-30% in the end product has a significant improvement of the creaminess and the melting behavior as well as on the heat shock stability of the ice cream.

The characteristics described in the summary of the patent claims as well as in the description and the related drawings can appear separately or in any combination within the realization of the invention.

LIST OF ABBREVIATIONS IN FIGS. 1-12:

FIG. 1:—
FIG. 2:—
FIG. 3:—
FIG. 4:
S1, S2=layer thickness of ice cream adhering to the inner barrel wall (S1 according to the invention, S2 conventional)
ΔS=reduction of adhering layer (=S2−S1)
$V_{ax}$=axial velocity component of the screw flight
n=r.p.m.
Sp=width of the screw channel
x,y,z=coordinates
FIG. 5:
H(z)=height of the screw channel (here: as function of the length coordinate z)
De(z)=inner screw diameter (here: as function of the length coordinate z)
α=angle between the inner screw contour line and the inner barrel wall
θ=screw angle (between a line perpendicular to the screw axis and a projection of the screw flight in the drawing plane)
δ=leakage gap height (radial difference between inner barrel radius and outer screw flight radius)
FIG. 6:
A=distance of screw axes
FIG. 7: see above
FIG. 8:
θa=screw angle at a certain length coordinate position
θb=screw angle at the inlet zone screw end
FIG. 9:
b1=length of the projection of a screw flight section perpendicular to the screw axis
Da=outer screw diameter
D=inner barrel diameter
FIG. 10:
c=radial length of intermeshing pins connected to the inner barrel wall
d=axial length of intermeshing pins connected to the inner barrel wall
a=projection length of screw flight section into a plane parallel to the screw axis
FIG. 11:
f=length of the intermeshing pins at the inner barrel wall in the circumferential direction
FIG. 12:
Config. 1=conventional extruder screw configuration
Config. 2=extruder screw configuration according to the invention

REFERENCES

Scientific Publications:
1. Bolliger S., Windhab E.
Prozesstechnologische Beeinflussung der Eiskristaligrößenverteilung in Eiskrem
ZDS-Band SIE-15, *Int. Symposium "INTERICE"*. ZDS Solingen, 27-29 Nov. 1995
2. Windhab E.
Influence of mechanical forces on the disperse structuring ice cream during continuous aeration/freezing processes
*AICHE, Proc. 5th World Congress of Chemical Engineering* 1996, 2, 169-175 (1996)
3. Bolliger S.; Windhab E.
Structure and Rheology of Multiphase Foods Frozen under Mechanical Energy Input at Low Temperatures
*Proc. 1st Int Symp. on Food Rheology and Structure*, Zürich; Mar. 16-21, 1997; Editor: E. Windhab; B. Wolf; Vincentz Verlag Hannover, 269-274
4. Bolliger S.; Windhab E.
The Influence of Mechanical Energy Input During The Freezing of Sorbet on its Structure
*Engineering & Food; Proc. Int. Conference on Engineering in Foods (ICEF 7)*; Brighton, England; 14-17 Apr. 1997; Editor: R. Jowitt, Sheffield Academic Press, E 17-21
5. Windhab E.
A New Low Temperature Extrusion Process for Ice Cream
*Int. Dairy Federation Symposium on Ice Cream*; Athens, Sep. 18-20, 1997
6. Windhab E.; Bolliger S.
Freezern von Eiskrem ohne Härten
*Proc. Int. Symp. "Interice"*. ZDS Solingen (1997); 21-33
7. Windhab, E.
New Developments in Ice Cream Freezing Technology and Related On-Line Measuring Techniques
In *"Ice Cream" Int. Dairy Federation*, edited by W. Buchheim, ISMN 92 9098 029 3, 112-131, (1998)
8. Windhab, E.
Neue Produktionskonzepte für Eiskrem auf Basis der Tieftemperaturextrusionstechnik
Proc. Int. Eiskrem-Symposium, Interice, ZDS-Solingen, 23-25, Nov. 1998, Nr. 12, 88-100 (1998)
9. Windhab, E.
Low Temperature Ice Cream Extrusion Technology and related Ice Cream Properties
*European Dairy Magazine* 1, 24-29, (1998)
10. Windhab, E. J.
New Developments in Crystallization Processing
*Journal of Thermal Analysis and Calorimetry*, Vol 57 (1999), 171-180
11. Bolliger, S., Kornbrust, B., Goff, H. D., Tharp, B. W. Windhab, E. J. (!!!)
Influence of emulsifiers on ice cream produced by conventional freezing and low temperature extrusion processing
*Internat. Dairy Journal* 10, 497-504 (2000)
12. Windhab E. J., H. Wildmoser
Tieftemperaturextrusion
*Proceedings Int. Seminar "Extrusion"*. ZDS-Solingen (D); 23-24 Oct. 2000
13. Wildmoser, H., Windhab E. J.
Neue Eiskremstrukturcharakteristika durch Tieftemperaturextrusion
*Proceedings Inter-Eis* 2000; SIE-10, 52-62, Solingen (Deutschland), 13-15, Nov. 2000
14. Windhab E. J., Wildmoser H.
Beiträge von Prozess und Rezeptur zur Kremigkeit von Eiskrem
*Proceedings Inter-Eis* 2000, SIE-10, 77-86, ZDS-Solingen (Deutschland), 13-15, Nov. 2000
15. Wildmoser H, Windhab E
Impact of flow geometry and processing parameters in ultra low temperature ice-cream extrusion (ULTICE) on ice-cream microstructure
European Dairy Magazine 2001; 5: 26-31
16. Wildmoser H and Windhab E. J.
Impact of flow geometry and processing parameters in Ultra Low Temperature Ice Cream Extrusion (ULTICE) on ice cream microstructure
INTERICE Tagungsband 2001; SIE-10, ZDS-Solingen 17. Windhab E J, Wildmoser H.
Extrusion: A Novel Technology for the Manufacture of Ice Cream
*Proceedings Conference on Emerging technologies, IDF World Dairy Summit*
Auckland, New Zealand, 30 Oct.-1 Nov. 2001
18. Windhab E J, Wildmoser H
Ultra Low Temperature Ice Cream Extrusion (ULTICE)
Proceedings: AITA Congress "Il Gelato", Milano (Italy); Mai 7 (2002)
Patent—Publications:
  WO 9746114, EP 0808577
  EP 0714650
  U.S. Pat. No. 8,516,659
  WO 0072697 A1
  U.S. Pat. No. 3,647,478
  U.S. Pat. No. 3,954,366
  U.S. Pat. No. 4,234,259
  EP 0438996 A2
  EP 0351476 A1
  DE 4202231 C1
  EP 0561118 A2
  U.S. Pat. No. 5,345,781
  FR 2717988 A1
  DK 0082/96; WO 9726800
  WO 9739637
  WO 9817125; U.S. Pat. No. 5,713,209
  WO 9925537
  WO 9924236

The invention claimed is:

1. A low temperature extrusion process for energy optimized, viscosity adapted micro-structuring of a frozen aerated food product, the process comprising the steps of:
  locally adjusting a rotational screw speed of an extruder screw that rotates within an extruder screw channel formed by an inner barrel wall, the extruder screw channel having an inner diameter and a length, pins fixed to the inner barrel wall extending into the inner diameter of the extruder screw channel;
  locally adjusting a mass flow rate of a partially frozen, aerated food product, the mass flow rate adjusted by a positive replacement pump installed at an extruder inlet;
  locally adjusting width variation of cuts in a screw flight, the cuts extending axially into the screw flight, the pins intermeshing with the cuts in the screw flight; and
  locally adjusting a cooling temperature at an inner wall of an extruder housing, the cooling temperature adjusted by an evaporation pressure of refrigerant, the process providing a mechanical treatment of the partially frozen, aerated food product over a length of an extruder screw channel zone with respect to its local viscosity, performed such that, in each of a subsequent zone there is a dispersing of air bubbles/air cells and at a same time a temperature decrease and related increase of the frozen water fraction is achieved, the process further providing a viscosity-adapted increase in shear treatment in a first 25% to 70% of a length of the extruder screw measured from an extruder inlet such that after about half or two-thirds of the extruder screw length a freezing degree of greater than 55% frozen water fraction related to the freezable water is reached.

2. The process of claim 1 comprising a characteristic length of zones into which the length of the extruder screw channel is divided with respect to an adaptation of a mechanical energy input for ongoing dispersing of air bubbles/air cells and synchronously decreasing temperature or increase of frozen water fraction, being one to tenfold of the outer screw diameter.

3. The process of claim 1 comprising a characteristic length of zones into which the length of the extruder screw channel is divided with respect to an adaptation of a mechanical energy input for ongoing dispersing of air bubbles/air cells and synchronously decreasing temperature or increase of frozen water fraction, being one to tenfold of the outer screw diameter, with a constant length of these zones along the extruder.

4. The process of claim 1 comprising a characteristic length of zones into which the length of the extruder screw channel is divided with respect to an adaptation of a mechanical energy input or ongoing dispersing of air bubbles/air cells and synchronously decreasing temperature or increase of frozen water fraction, being one to tenfold of the outer screw diameter with characteristic zone length adapted to the local change of the mass viscosity.

5. The process of claim 1, wherein the adjustment of the rotational screw speed, mass flow rate, and cooling temperature at an inner wall of an extruder housing are regulated in such a way that for a conventional standard vanilla ice cream mass temperature $\leq -11°$ C. or more generally a frozen water mass fractions of about $\geq 60\%$ related to the total freezable water fraction are achieved within a first 50-75% of a length of an extruder measured from an extruder inlet.

6. The process of claim 1 comprising an adjustment of a mechanical mass treatment with respect to its viscosity in the related extruder zone by adapted variation of the screw channel height locally in each of at least 3 zones into which the length of the extruder screw channel is divided such that a ratio of screw channel height and outer screw diameter increases in each zone as the screw extends away from the extruder inlet.

7. The process of claim 1 comprising an adjustment of a mechanical mass treatment with respect to its viscosity in a related extruder zone by adapted variation of a number of screw flights locally in each of at least 3 zones into which the length of the extruder screw channel is divided, the adapted variation comprising continuously reducing the number of screw flights per zone such that the screw flights per zone decreases as the screw extends away from the extruder inlet.

8. The process of claim 1 comprising an adjustment of a mechanical mass treatment with respect to its viscosity in a related extruder zone by adapted variation of a screw angle locally in each of at least 3 zones into which the length of the extruder screw channel is divided such that the screw angle is between 45 and 60 degrees in a first zone that is a first third of the length of the extruder screw channel, the screw angle is between 30 to 35 degrees in a second zone that is a second third of the length of the extruder screw channel, and the screw angle is between 25 and 30 degrees in a third zone that is a final third of the length of the extruder screw channel.

9. The process of claim 1, wherein the pins and the width of the cuts in the flight are locally adjusted based on the mass viscosity.

10. The process of claim 1 comprising an increasing temperature reduction and increasing frozen water fraction along the extruder length due to optimized heat transfer to an evaporating refrigerant contacting an outer wall of an extruder housing by minimizing a leakage gap width between an outer screw flight diameter and an inner extrusion housing diameter.

11. The process of claim 1 comprising a decreasing mass temperature, related increasing frozen mass fraction and increasing dispersing of a microstructure along the extruder length due to optimized heat transfer to an evaporating refrigerant contacting an outer wall of an extruder housing by generating a flow pattern at an outer front end of a screw flight, which leads to a reduction of the frozen material wall layer thickness not being wiped off the screw flight(s) smaller than a leakage gap width.

12. The process of claim 1 comprising a decreasing mass temperature, related increasing frozen mass fraction and increasing dispersing of a microstructure along the extruder length due to optimized heat transfer to an evaporating refrigerant contacting an outer wall of the extruder housing by generating a flow pattern at an outer front end of a screw flight, which leads to a reduction of the frozen material wall layer thickness not being wiped off by the screw flight(s) smaller than a leakage gap width by adjusting a profile of a screw flight front edge which is incline to an inner barrel wall or rounded with a well defined radius.

13. The process of claim 1, wherein a mechanical energy input along the length of the extruder screw is varied as a function of a local viscosity of the partially frozen, aerated food.

* * * * *